(12) United States Patent
Lee

(10) Patent No.: US 7,974,811 B2
(45) Date of Patent: *Jul. 5, 2011

(54) SYSTEM FOR OPTIMAL ALIGNMENT OF A BEARING SEAL ON A SHAFT OF A GAS TURBINE

(75) Inventor: Robert M. Lee, Magnolia, MA (US)

(73) Assignee: Axiam, Incorporated, Gloucester, MA (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/491,553

(22) Filed: Jun. 25, 2009

(65) Prior Publication Data

US 2009/0320309 A1 Dec. 31, 2009

Related U.S. Application Data

(63) Continuation of application No. 11/220,392, filed on Aug. 31, 2005, now Pat. No. 7,565,257, which is a continuation-in-part of application No. 11/179,339, filed on Jul. 12, 2005, now Pat. No. 7,765,082, which is a continuation-in-part of application No. 11/090,963, filed on Mar. 25, 2005, now Pat. No. 7,739,072, which is a continuation of application No. 09/950,942, filed on Sep. 11, 2001, now Pat. No. 6,898,547.

(60) Provisional application No. 60/231,820, filed on Sep. 11, 2000.

(51) Int. Cl.
*G01D 1/00* (2006.01)

(52) U.S. Cl. ........................................................ 702/127

(58) Field of Classification Search ................... 702/127
See application file for complete search history.

(56) References Cited

U.S. PATENT DOCUMENTS

| | | | |
|---|---|---|---|
| 4,131,387 A | 12/1978 | Kazin et al. | |
| 4,538,455 A * | 9/1985 | Klufas | 73/112.02 |
| 5,373,922 A | 12/1994 | Marra | |
| 5,538,258 A | 7/1996 | Hager et al. | |
| 5,564,656 A | 10/1996 | Gilbert | |
| 5,636,848 A | 6/1997 | Hager et al. | |
| 5,689,435 A | 11/1997 | Umney et al. | |
| 5,768,149 A | 6/1998 | Umney et al. | |
| 5,821,412 A | 10/1998 | Bryant et al. | |
| 6,101,911 A | 8/2000 | Newell et al. | |
| 6,148,518 A | 11/2000 | Weiner et al. | |
| 6,341,419 B1 | 1/2002 | Forrester et al. | |
| 6,452,179 B1 | 9/2002 | Coates et al. | |
| 6,473,794 B1 | 10/2002 | Guheen et al. | |
| 6,519,571 B1 | 2/2003 | Guheen et al. | |
| 6,898,547 B1 | 5/2005 | DeBlois et al. | |
| 2002/0122583 A1 | 9/2002 | Thompson | |

* cited by examiner

*Primary Examiner* — Aditya Bhat

(74) *Attorney, Agent, or Firm* — Hamilton, Brook, Smith & Reynolds, P.C.

(57) ABSTRACT

A method for substantially aligning a bearing seal on a shaft of a turbine engine. The method including measuring characteristics of the subject shaft, measuring characteristics of a plurality of bearing seal components and determining and outputting alignment information of the plurality of bearing seal components with the shaft based on the measured characteristics. The alignment information can be outputted for either substantially perpendicular alignment for an axial seal or substantially parallel alignment for a radial seal.

20 Claims, 9 Drawing Sheets

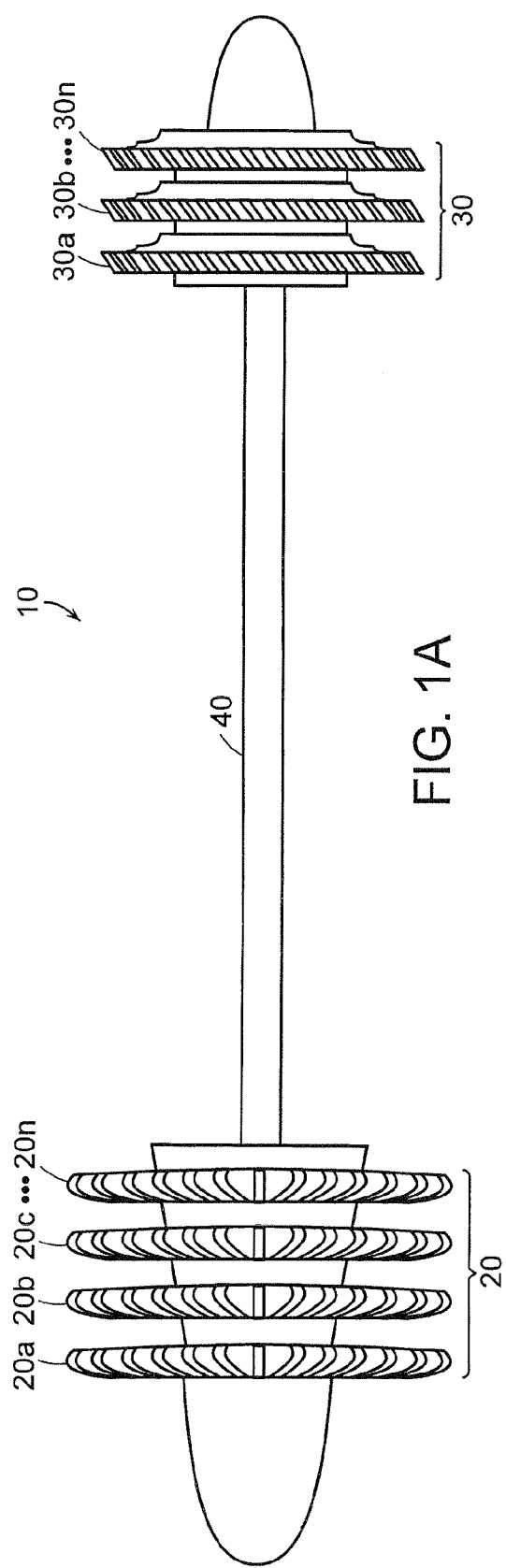
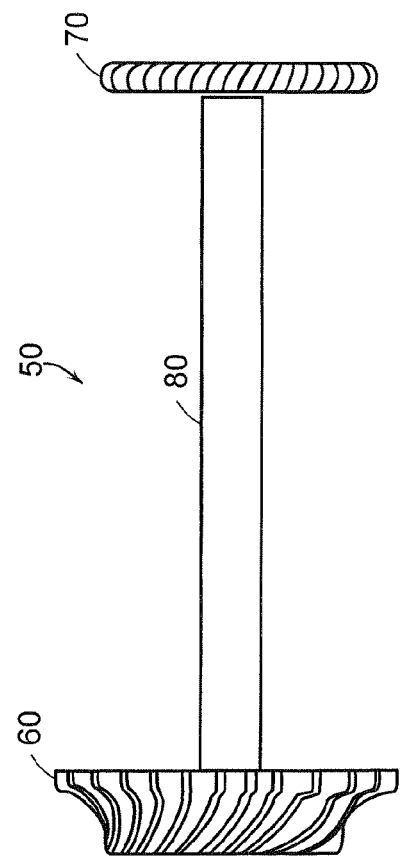
FIG. 1A
FIG. 1B

SYSTEM FOR OPTIMAL ALIGNMENT OF A BEARING SEAL ON A SHAFT OF A GAS TURBINE

RELATED APPLICATIONS

This application is a continuation of U.S. application Ser. No. 11/220,392, filed Aug. 31, 2005, now U.S. Pat. No. 7,565,257, issued on Jul. 21, 2009, which is a continuation-in-part of U.S. application Ser. No. 11/179,339, filed on Jul. 12, 2005, now U.S. Pat. No. 7,765,082, issued on Jul. 27, 2010, which is a continuation-in-part of U.S. application Ser. No. 11/090,963, filed Mar. 25, 2005, now U.S. Pat. No. 7,739,072, issued on Jun. 15, 2010, which is a continuation of U.S. application Ser. No. 09/950,942, filed on Sep. 11, 2001, now U.S. Pat. No. 6,898,547, issued on May 24, 2005, which claims the benefit of U.S. Provisional Application No. 60/231,820, filed on Sep. 11, 2000, the entire teachings of which are herein incorporated by reference.

BACKGROUND OF THE INVENTION

A gas turbine, typically called a 'jet' engine, was introduced by Frank Whittle in the 1930s. The gas turbine is an internal combustion engine. In the internal combustion engine, air is compressed, fuel added, the mixture ignited, and the rapid expansion of the resultant hot gas produces the power. The combustion in a jet engine is continuous and its power results from expanding gas being forced out of the rear of the engine. The expanding gas flow is an action which creates a reaction of equivalent force or thrust. The thrust is transmitted through the engine to the aircraft, propelling it through the air.

The gas turbine includes three main sections: a compressor section, a combustion section; and a turbine section. The compressor section draws air into the engine, pressurizes it, and delivers it to the combustion chamber. The combustion chamber receives air from the compressor section and mixes the air with fuel sprayed from nozzles in the front of the chamber. The mixture is burned at temperatures up to 2000° C. to generate the maximum possible heat energy. The turbine section extracts energy from the hot exhaust gases to drive the compressor section.

The compressor section includes a low-pressure compressor and a high pressure compressor. Each compressor includes a plurality of discs which are bolted together to form a rotor. Rotor blades are mounted on the rotor. The turbine section includes a low-pressure turbine and a high pressure turbine. Like each compressor, each turbine includes a plurality of discs which are bolted together to form a rotor. Rotor blades are mounted on the rotor. Each compressor is driven from a respective turbine by a single shaft.

Prior to assembly, various characteristics of each disc are measured and used as inputs to a software program that provides optimal assembly information for each rotor based on the measured characteristics. The compressor section or turbine section is then assembled accordingly. After each compressor section and turbine section is assembled, various characteristics of each compressor and turbine are measured and used as inputs to a software program that provides optimal assembly information for the gas turbine (whole engine) based on the measured characteristics. The gas turbine/engine is then assembled accordingly. Example software programs for assembling engines include: "ShaftMate™" by Axiam, Incorporated of Gloucester, Mass.

SUMMARY OF THE INVENTION

The gas turbine is assembled by bolting the shaft onto the low-pressure turbine. In turn, the high-pressure turbine, high-pressure compressor, and low-pressure compressor are positioned over the shaft and assembled based on the optimal assembly information provided from the above-mentioned software program. The shaft is commonly supported by appropriate journal and thrust bearings mounted within a bearing housing, wherein oil is circulated from a sump to lubricate the bearings.

In general terms, it is highly desirable to minimize and eliminate oil leakage along the shaft and through the end wall of the bearing housing. Alternately stated, it is desirable to confine circulatory oil flow to the interior of the bearing housing. In this regard, a wide variety of oil seal configurations have been proposed in efforts to overcome oil leakage problems. However, the high speed shaft rotation and other operating conditions in a gas turbine environment have generally precluded complete elimination of the oil leakage. That is, high speed shaft rotation tends to result in relatively rapid wear of seal structures and early onset of oil leakage. This problem is compounded by high temperature operating environments and adverse differential pressures which may be present on opposite sides of the bearing housing end wall.

The present invention provides a method for substantially aligning a bearing seal on a shaft of a turbine engine including measuring characteristics of the subject shaft, measuring characteristics of a plurality of bearing seal components and determining and outputting alignment information of the plurality of bearing seal components with the shaft based on the measured characteristics. The alignment information can be outputted for either substantially perpendicular alignment for an axial seal or substantially parallel alignment for a radial seal.

The plurality of bearing seal components can include at least one spacer component, a ball bearing component, a sealing component, and a nut. The measured characteristics can include at least one of the following: roundness, flatness, concentricity, concentricity angle, runout, runout angle, perpendicularity, perpendicularity angle, perpendicular plane deviation, centerline deviation, centerline deviation angle, biplane deviation, and biplane deviation angle.

The method further comprises the step of coupling the plurality of bearing seal components to the shaft based on the outputted alignment information. The coupled assembly can then be verified to determine of the bearing seal is correctly coupled to the shaft.

Measuring characteristics of the subject shaft can include (1) rotating the shaft at a speed from zero to five revolutions per minute and (2) engaging a face of the shaft with at least one sensor for measuring characteristics of the face. Measuring characteristics of a bearing seal component can include rotating the bearing seal component at a speed from zero to five revolutions per minute and engaging a face of the bearing seal component with at least one sensor for measuring characteristics of the face.

A constant pressure can be applied to each bearing seal component during assembly. In one embodiment, the constant pressure is applied by hydraulic tooling. The constant pressure can be further assisted by using temperature to expand and or contract each bearing seal component during the assembly process.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1A shows a plan view of a low-pressure turbine spool;

FIG. 1B shows a plan view of a high-pressure turbine spool;

DETAILED DESCRIPTION OF THE INVENTION

Figure 1C:
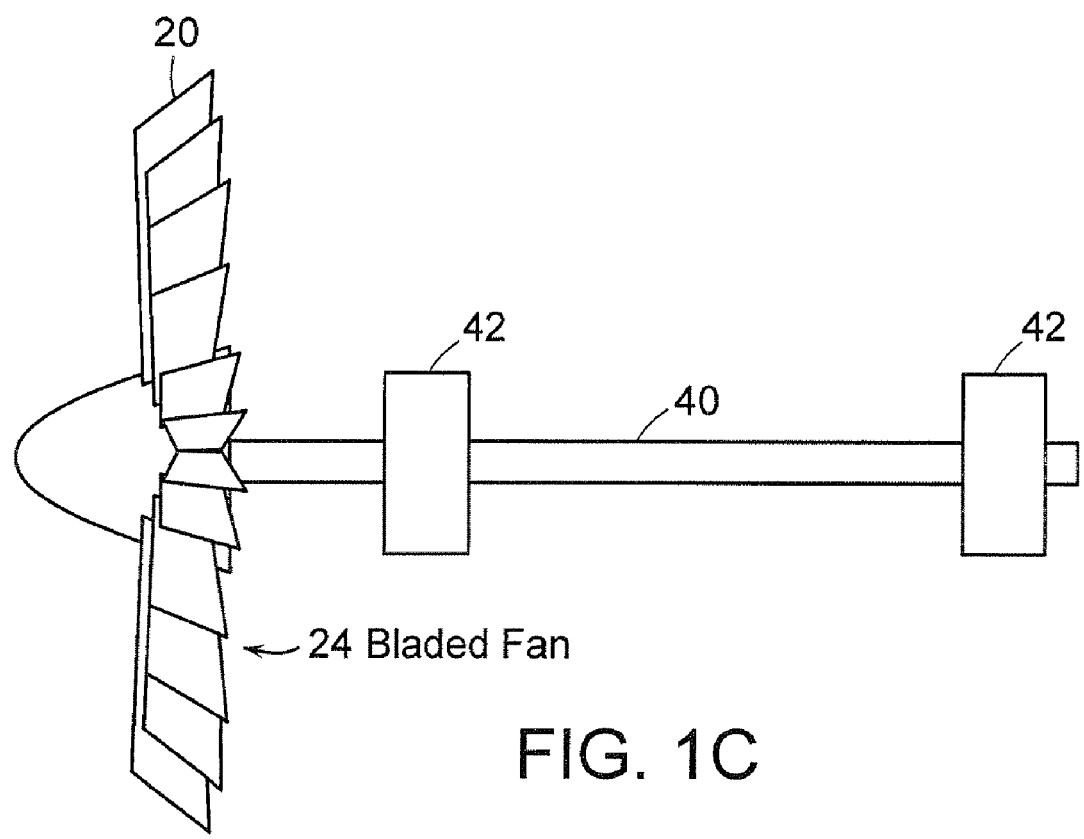
FIG. 1C shows a plan view of a low-pressure shaft including a pair of bearing housings.

A description of preferred embodiments of the invention follows.

FIG. 1A shows a low-pressure spool 10 of a gas turbine. The low-pressure spool 10 includes a low-pressure compressor 20, a low-pressure turbine 30, and a low-pressure shaft 40. The low-pressure compressor 20 includes a plurality of discs 20a . . . 20n. The low-pressure turbine 30 includes a plurality of discs 30a . . . 30n.

FIG. 1B shows a high-pressure spool 50 of a gas turbine. The high-pressure spool 50 includes a high-pressure compressor 60, a high-pressure turbine 70, and a high-pressure shaft 80. The high pressure shaft 80 rotates about the low-pressure shaft 40. In some engine designs, the low-pressure shaft 40 and the high-pressure shaft 80 are the same shaft.

FIG. 1C generally shows the a low-pressure shaft 40 extending through a pair of bearing housings 42. An oil circulation system delivers lubricating oil to lubricate the bearings (not shown) within the respective bearing housings 42, wherein the oil flows through the bearings for drainage to a sump, not shown, within a lower region of the bearing housing. As will be readily understood, proper alignment of components of each bearing housing 42 will substantially reduce the onset of oil leakage. Further, proper alignment can reduce rapid wear of the seal structures.

Assembly of the low-pressure spool 10 and high pressure spool 50 is a follows:

Characteristic information of the high-pressure compressor 60 is measured and used by a software program (e.g. "ShaftMate™" by Axiam, Incorporated of Gloucester, Mass.) to output correct alignment information for aligning the high-pressure compressor 60, the high-pressure turbine 70 and the high pressure shaft 80. In instances where the high-pressure compressor 60 includes multiple discs, the steps associated with assembly of the low-pressure turbine 30 described below are followed.

Characteristic information of the high-pressure turbine 70 is measured and used by the software program to output correct alignment information for aligning the high-pressure compressor 60, the high-pressure turbine 70 and the high pressure shaft 80. In instances where the high pressure turbine 70 includes multiple discs, the steps associated with assembly of the low-pressure turbine 30 described below are followed.

Using the system described below, characteristic information of the high pressure shaft 80 is measured and used by the software program to output correct alignment information for coupling the high-pressure shaft 80 to the high-pressure turbine 70 and the high-pressure compressor 60.

The software program uses the stored characteristic information of the high-pressure compressor 60, the high-pressure turbine 70, and the high pressure shaft 80 to provide the correct alignment information. The correct alignment information is output to allow the components to be coupled together. The high-pressure compressor 60 is aligned and inserted onto high-pressure shaft 80 using the outputted information. Next, the high-pressure turbine 70 is aligned and bolted to the high-pressure shaft 80 using the outputted information. The high-pressure spool 50 is now complete.

Characteristic information for each individual discs 30a . . . 30n of the low-pressure turbine 30 is measured and used by the software program to output correct alignment information for the low-pressure turbine 30. The discs 30a . . . 30n are placed in a hydraulic press and aligned based on the output from the software program. The hydraulic press is engaged and the discs 30a . . . 30n are bolted together to form the low-pressure turbine 30. Characteristic information of the assembled low-pressure turbine 30 is measured and stored for later use.

Characteristic information for each individual discs 20a . . . 20n of the low-pressure compressor 20 is measured and used by a software program to output correct alignment information for the low-pressure compressor 20. The discs 20a . . . 20n are placed in a hydraulic press and aligned based on the output from the software program. The hydraulic press is engaged and the discs 20a . . . 20n are bolted together to form the low-pressure compressor 20. Characteristic information of the assembled low-pressure compressor 20 is measured and stored for later use.

Using the system described below, characteristic information of the low-pressure shaft 40 is measured and used by the software program to output correct alignment information for coupling the low-pressure shaft 40 to the low-pressure turbine 30 and the low-pressure compressor 20.

The software program uses the stored characteristic information of the low-pressure compressor 20, low-pressure turbine 30, low-pressure shaft 40, and high-pressure spool 50 to provide the correct alignment information of the gas turbine spool assembly. The low-pressure compressor 20 is aligned and coupled to the low-pressure shaft 40 using the outputted information. Next, the high-pressure spool 50 is aligned and inserted over the low-pressure shaft 40 using the outputted information such that the high-pressure compressor 60 is in close proximity to the low-pressure compressor 20. Next, the low-pressure turbine 30 is aligned and bolted to the low-pressure shaft 40 using the outputted information. The low-pressure spool 10 and gas turbine spool assembly is now complete.

It should be understood by one skilled in the art that the assembly of the low-pressure compressor 20, the high-pressure compressor 60, the high-pressure turbine 70, and the low-pressure turbine 30 does not have to be sequential as described above. In instances where a single shaft is used the high-pressure compressor 60 and the high pressure turbine 70 are coupled to the single shaft with techniques known in the art.

Figure 2A:
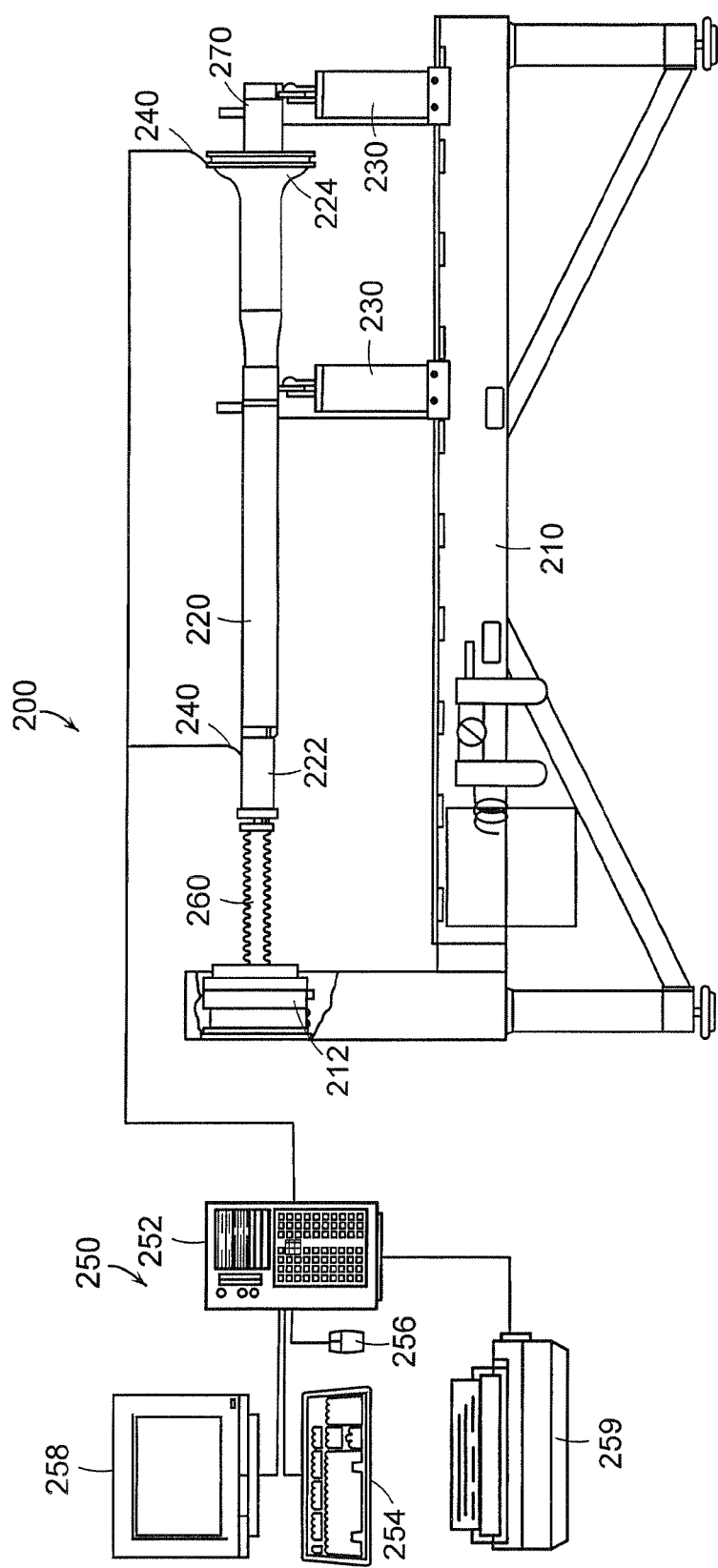
FIG. 2A shows a system diagram of one embodiment of the present invention.

FIG. 2A shows a system diagram of a system 200 of the present invention for measuring characteristic information of components of a gas turbine. The system 200 includes a horizontal base or bed 210, at least one sensor or probe 240, a determination module 250, and a variable speed drive 212.

The variable speed drive 212 preferably rotates the components at a speed from 0 to 5 revolutions per minute (RPM). In the configuration as shown, two stands 230 rotatably support a shaft 220 in a horizontal orientation.

The system 200 further includes a drive coupling 260 and a stub shaft 270. The drive coupling 260 couples the shaft 220 to the variable speed drive 212. The drive coupling 260 is a zero backlash drive coupling that constrains axial motion of the shaft 220 and prevents backlash during shaft 220 rotation. The stub shaft 270 couples to the shaft 220 to provide additional support during rotation.

The shaft 220 includes a spline 222 and a hub 224. At least one sensor or probe 240 measures characteristics of either the spline 222 or the hub 224 while the shaft 220 is rotating. The measured characteristics include roundness, flatness, concentricity, concentricity angle, runout, runout angle, perpendicularity, perpendicularity angle, Perpendicular Plane Deviation™, Centerline Deviation™, centerline deviation angle, Biplane Deviation™, and Biplane Deviation Angle™. The probe 240 can be a digital probe or an analog probe. The probe 240 converts linear motion into an electrical signal that is used by the determination module 250 to provide a best-fit assembly solution of the shaft to other modules/sections of the gas turbine. The probe 240 provides axial and radial accuracy of 20-30 millionths of an inch.

The determination module 250 can include a central processing unit (CPU) located in a housing 252, an input device such as a keyboard 254 or a mouse 256, and a display device such as a monitor 258 or a printer 259. The CPU runs a software program which uses the measured characteristic data to determine the best-fit assembly solution of the shaft 220. The best-fit assembly solution is output to one or both of the display devices 258, 259.

Figure 2B:
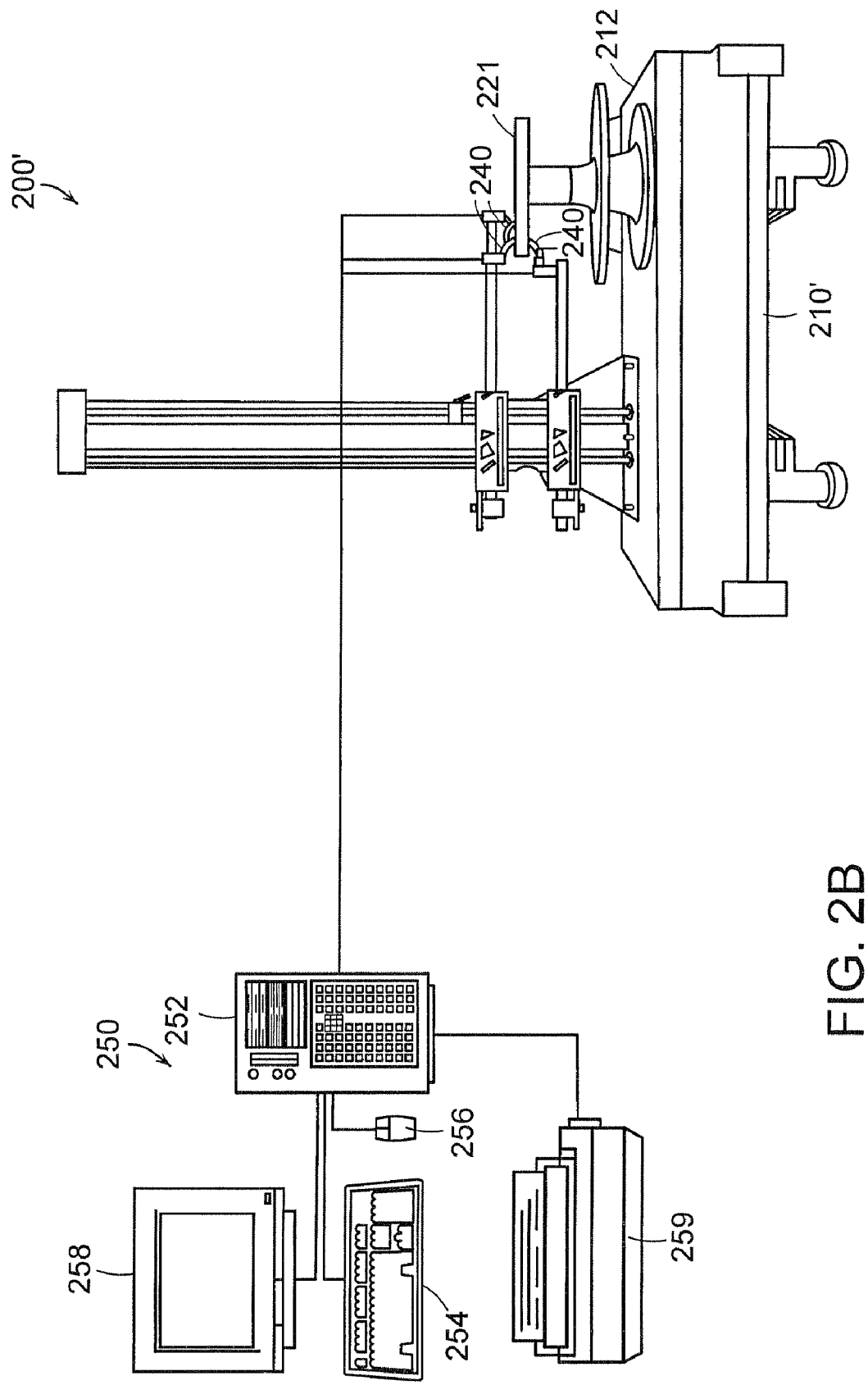
FIG. 2B shows a system diagram of another embodiment of the present invention.

FIG. 2B shows a system diagram of a system 200' of the present invention for measuring characteristic information of a components of a gas turbine. The system 200' is similar to the system 200 of FIG. 2A except the base 210 is replaced with a vertical base 210'. As shown, the shaft 220 has been replaced with component 221 to illustrate any component of the gas turbine engine can be measured using either system 200, 200'.

Figure 3:
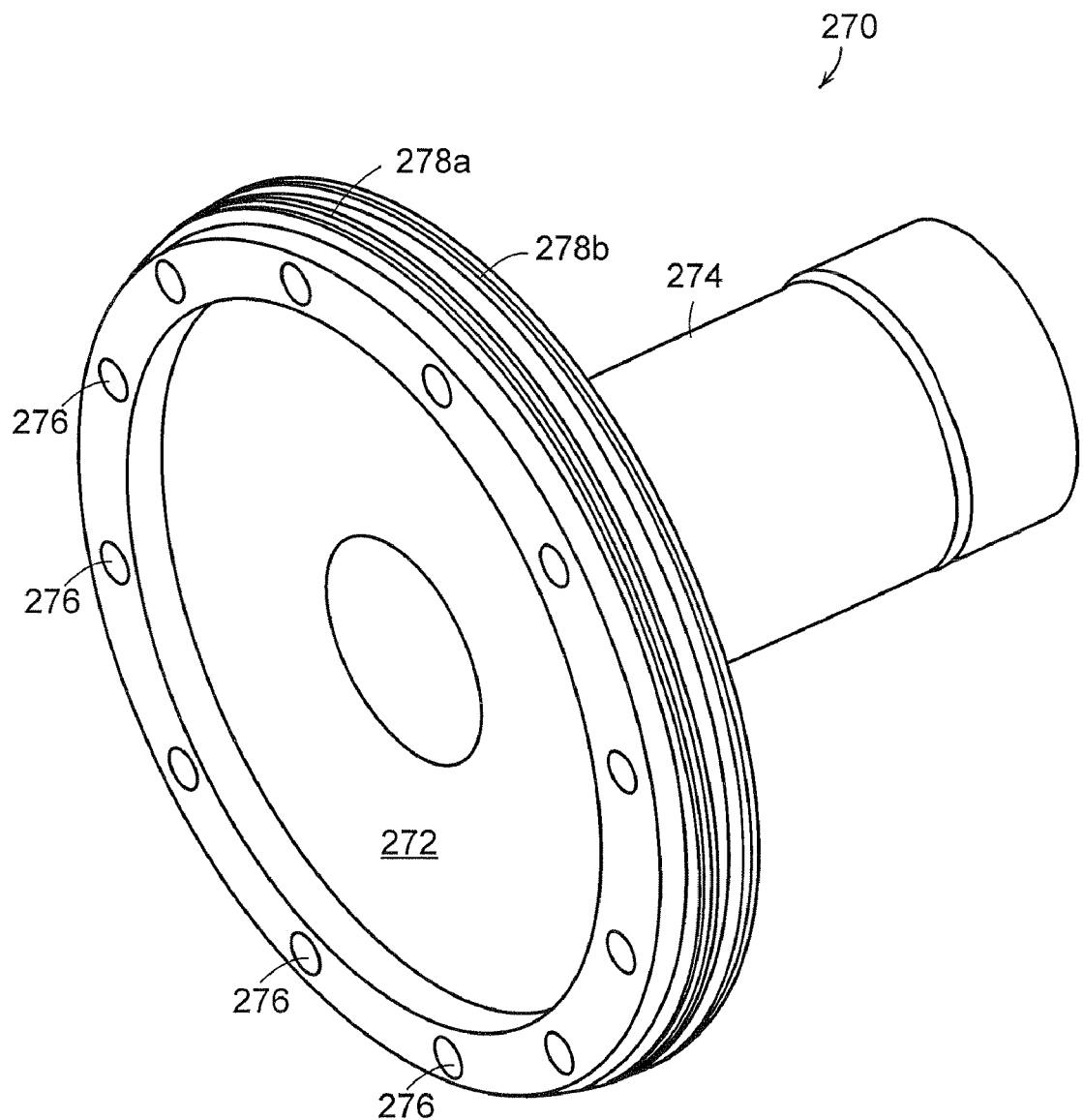
FIG. 3 shows a perspective view of a stub shaft of the system of FIG. 2A.

FIG. 3 is a perspective view of the stub shaft 270. The stub shaft includes a hub 272 and a short shaft 274. The hub includes a plurality of bolt holes 276 for coupling the stub shaft 270 to the shaft 220. The short shaft 274 rotatably engages wheel 232 of the stand 230 as shown in FIG. 2. The hub 272 further includes an inner cylindrical ring 278a and an outer cylindrical ring 278b. The inner cylindrical ring 278a is smaller in diameter than the outer cylindrical ring 278b such that when the stub shaft 270 is coupled to the shaft 220 a groove is formed and allows measurement of a surface of the shaft 220 by probes/sensors 240.

Figure 4A:
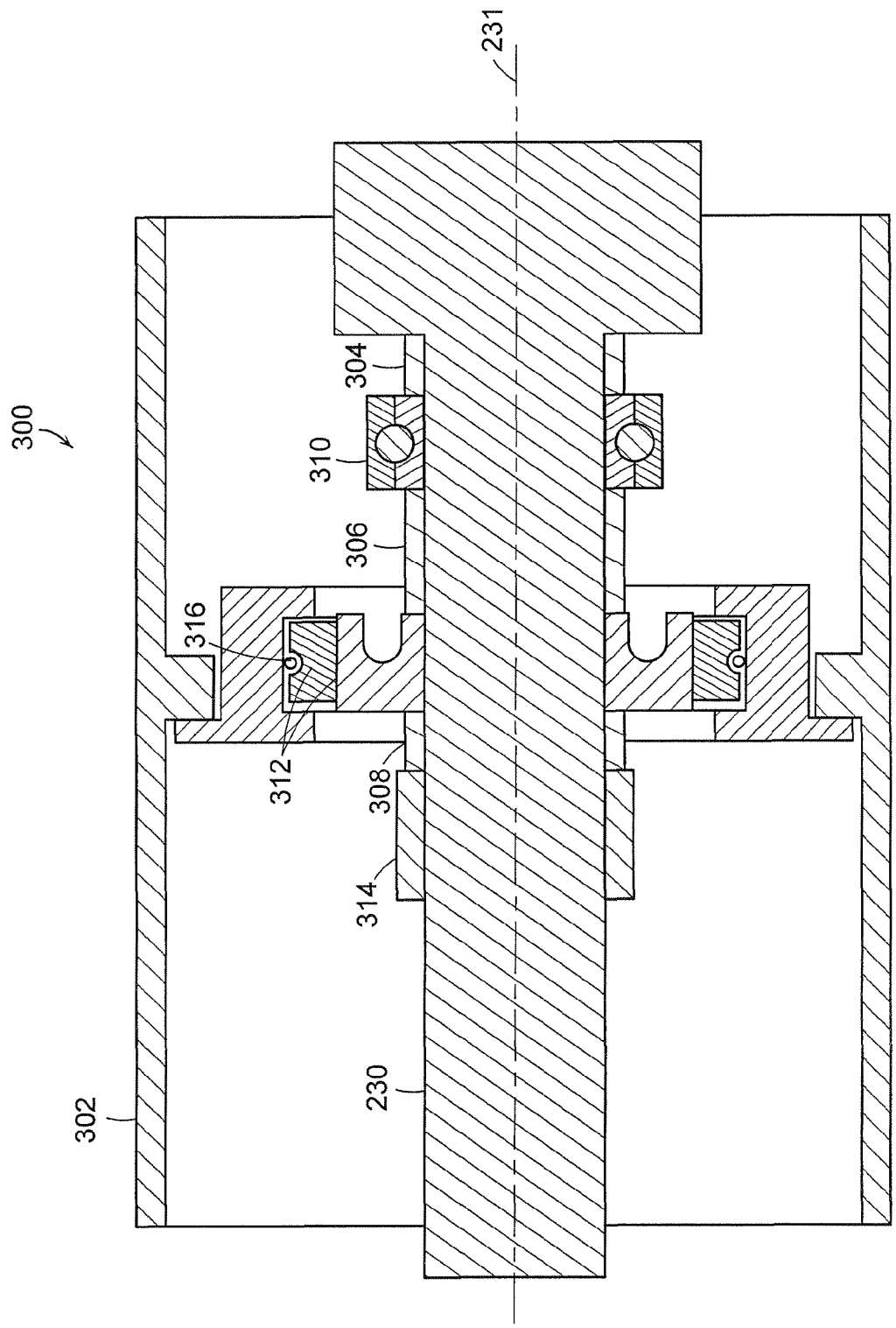
FIG. 4A shows a cross-sectional view of a radial seal bearing assembly.

FIG. 4A is a cross-sectional view of a radial bearing seal assembly 300. The radial bearing seal assembly 300 includes a bearing seal housing 302, a plurality of spacers 304, 306, 308, a ball-bearing assembly 310, a radial seal face 312, a nut 314, and spring 316. In operation, the spring 316 provides a force on the radial seal face 312. Oil will begin to leak and the radial seal face 312 will begin to wear if the radial seal face 312 is not substantially parallel to an axis 231 of the shaft 230. To provide substantially parallel alignment, the joint created between each component (304, 306, 308, 310, 312, 314) should also be substantially parallel to the shaft axis 231. As such, the characteristics of each component (304, 306, 308, 310, 312, 314) are measured using one of the above mentioned system 200, 200'. The measured characteristics include roundness, flatness, concentricity, concentricity angle, runout, runout angle, perpendicularity, perpendicularity angle, Perpendicular Plane Deviation™, Centerline Deviation™, Centerline Deviation Angle™, Biplane Deviation™, and Biplane Deviation Angle™.

The characteristic data is input into the determination module 250 (FIGS. 2A and 2B) where it is compared with the characteristic data of the shaft 230. A software program within the determination module 250 uses the measured characteristic data to determine the best-fit assembly solution for aligning and assembling the radial bearing seal assembly 300 with the shaft 230. For example, in one embodiment the biplane deviation and the centerline deviation of each component (304, 306, 308, 310, 312, 314) is compared to the centerline deviation of the shaft 230. After which, the best-fit assembly solution is output to one or both of the display devices 258, 259.

Figure 4B:
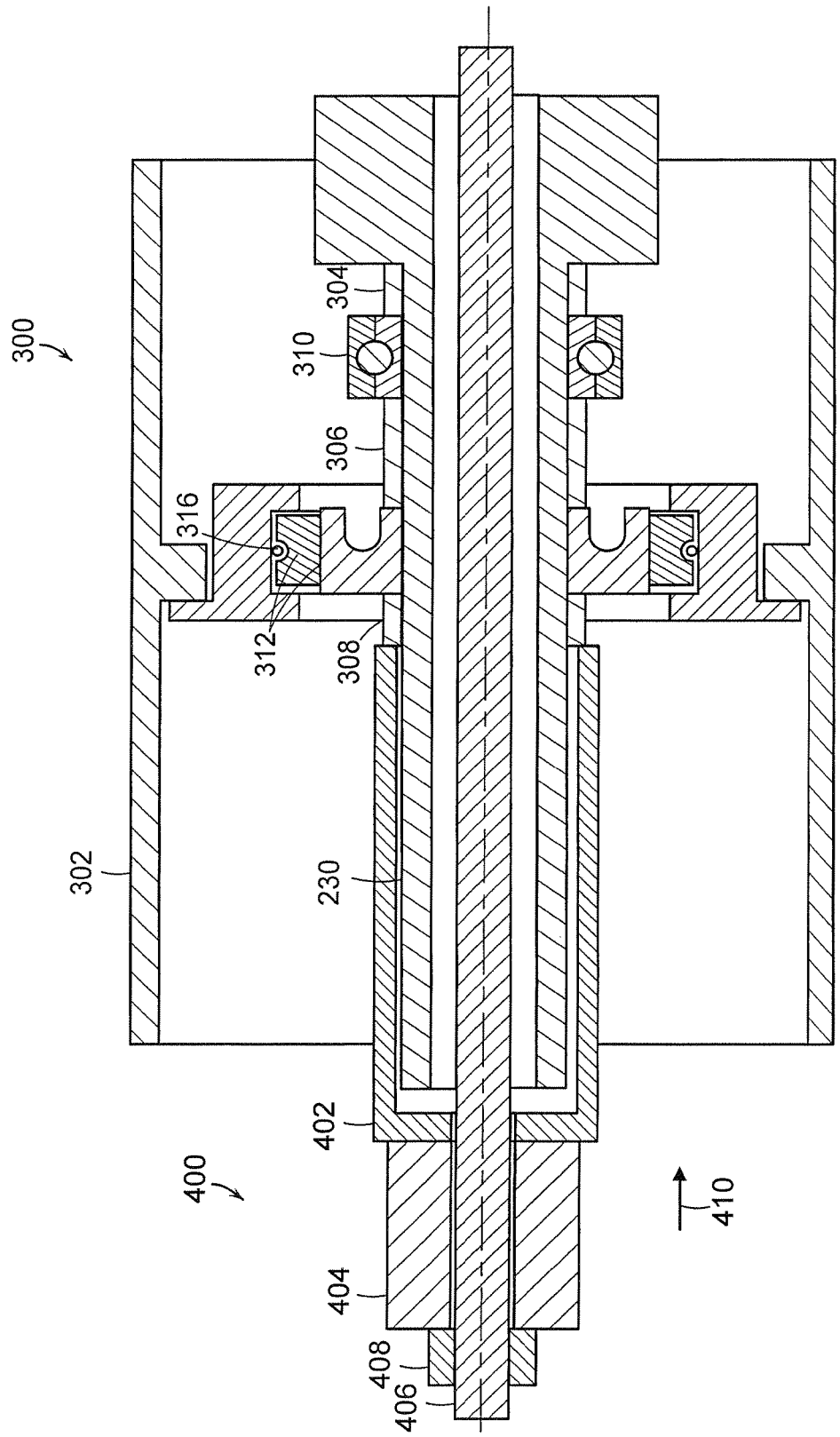
FIG. 4B shows assembly tooling for the radial seal bearing assembly of FIG. 4A.

As shown in FIG. 4B, the radial bearing seal assembly 300 can be assembled on the shaft 230 under constant pressure, such as by way of hydraulic tooling 400. The hydraulic tooling includes a connection member 402, a hydraulic cylinder 404, a rod 406, and a nut 408. The connection member 402 fits over the shaft 230 and contacts the bearing seal component being installed. The hydraulic cylinder 404 provides the necessary contact pressure (force) to seat the component(s). The rod 406 and the nut 408 allow the hydraulic cylinder to provide force in the installation direction as shown by arrow 410. The assembly process can be further assisted using heating and cooling (temperature) techniques to expand or contract the bearing seal components. The method described above is by way of example and it should be understood one or more of the components can be installed in the method described. To verify correct alignment, characteristic data for the entire assembly (bearing seal assembly 300 and the shaft 230) can be measured using either system 200, 200' and the data compared to the expected output data from the original measurements.

Figure 5A:
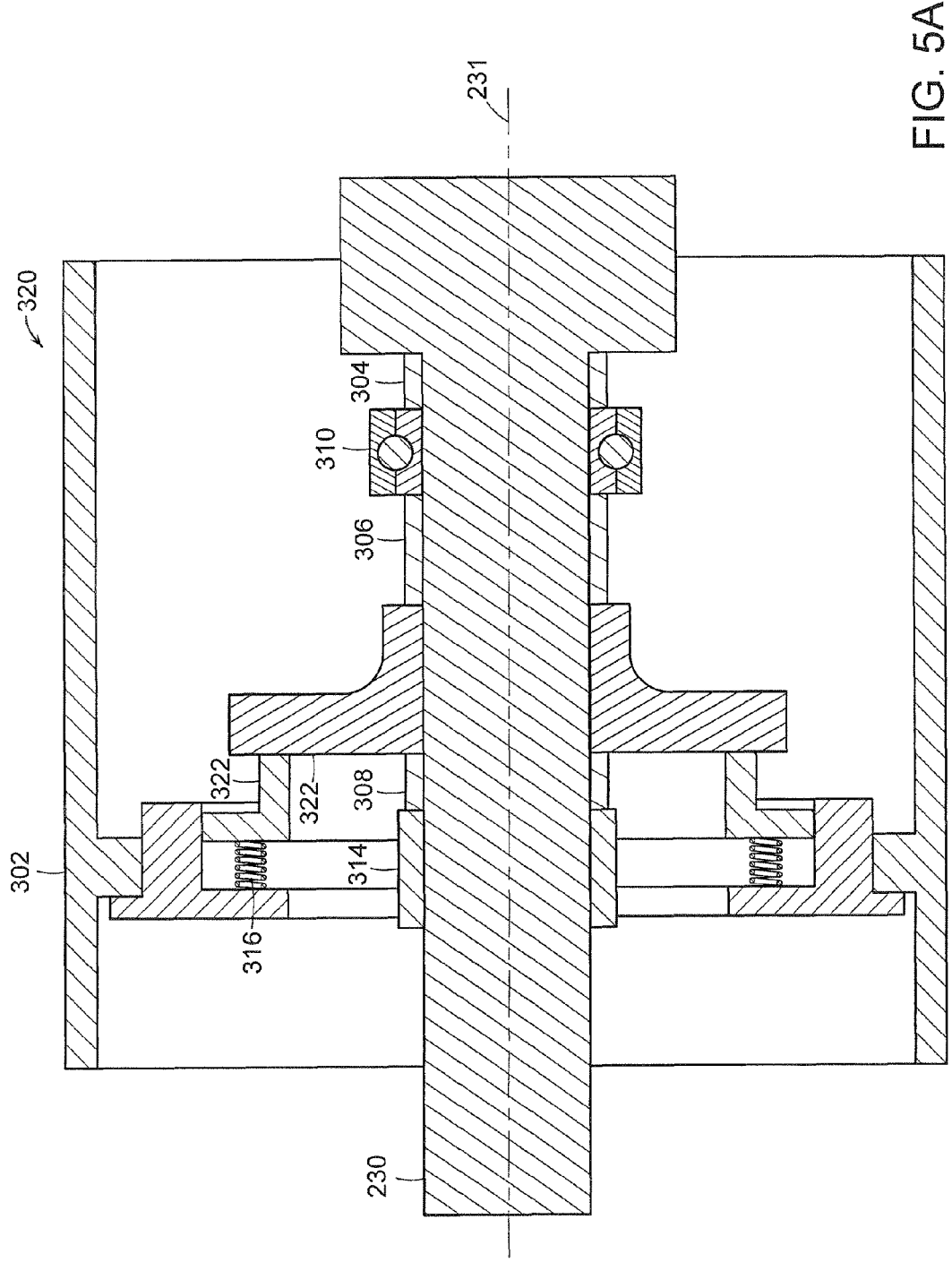
FIG. 5A shows a cross-sectional view of an axial seal bearing assembly.

FIG. 5A is a cross-sectional view of an axial bearing seal assembly 320. The axial bearing seal assembly 320 includes similar components (elements) to the radial bearing assembly 300 except the a radial seal face 312 is replaced with an axial seal face 322. A such, oil will begin to leak and the axial seal face 322 will begin to wear if the axial seal face 322 is not substantially perpendicular to the axis 231 of the shaft 230. To provide substantially perpendicular alignment, the joint created between each component (304, 306, 308, 310, 322, 314) should also be substantially parallel. As with the radial bearing seal 300, the characteristics of each component (304, 306, 308, 310, 322, 314) are measured using on of the above mentioned system 200, 200'.

A software program within the determination module 250 uses the measured characteristic data to determine the best-fit assembly solution for aligning and assembling the axial bearing seal assembly 320 with the shaft 230. For example, in one embodiment the biplane deviation and the centerline deviation of each component (304, 306, 308, 310, 312, 314) is compared to the centerline deviation of the shaft 230. After which, the best-fit assembly solution is output to one or both of the display devices 258, 259.

Figure 5B:
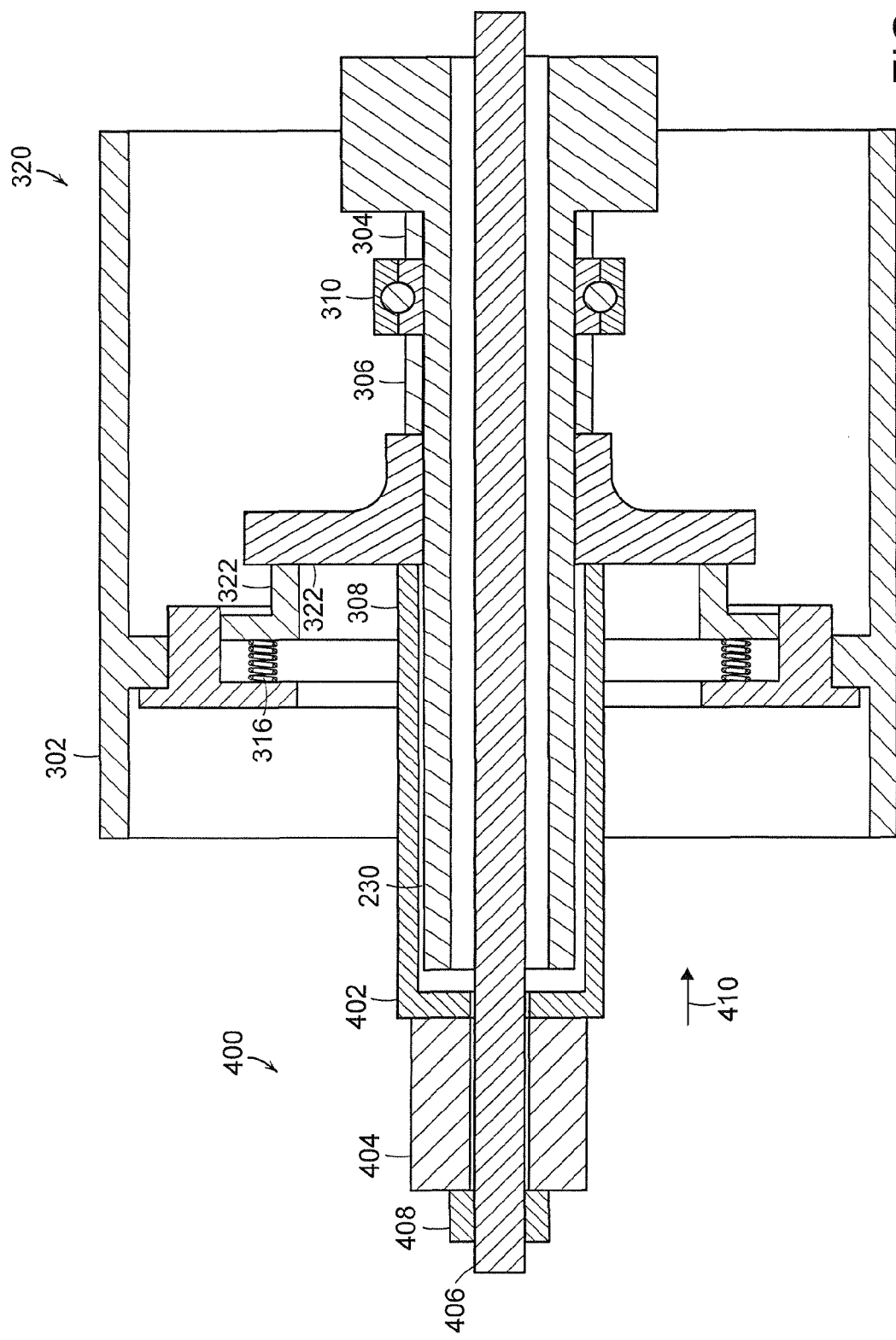
FIG. 5B shows assembly tooling for the axial seal bearing assembly of FIG. 5A.

As shown in FIG. 5B, the axial bearing seal assembly 320 can be assembled on the shaft 230 under constant pressure, such as by way of hydraulic tooling 400. The hydraulic tooling includes a connection member 402, a hydraulic cylinder 404, a rod 406, and a nut 408. The connection member 402 fits over the shaft 230 and contacts the bearing seal component being installed. The hydraulic cylinder 404 provides the necessary contact pressure (force) to seat the component. The rod 406 and the nut 408 allow the hydraulic cylinder to provide force in the installation direction as shown by arrow 410. The assembly process can be further assisted using heating and cooling (temperature) techniques to expand or contract the bearing seal components. The method described above is by way of example and it should be understood that one or more of the components can be installed in the method described. To verify correct alignment, characteristic data for the entire assembly (bearing seal assembly 320 and the shaft 230) can be measured using either system 200, 200' and the data compared to the expected output data from the original measurements.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer based method of assembling turbine engine parts, comprising:
    measuring characteristics of a subject shaft using means effectively coupled to a computer;
    measuring characteristics of a plurality of bearing seal components using the means effectively coupled to the computer; and
    determining and outputting assembly instructions having information aligning the plurality of bearing seal components on the shaft of a turbine engine, the computer determining alignment information of each of the bearing seal components with the shaft based on the measured characteristics.

2. The computer based method of claim 1, wherein the measured characteristics include at least one of roundness, flatness, concentricity, concentricity angle, runout, runout angle, perpendicularity, perpendicularity angle, perpendicular plane deviation, centerline deviation, centerline deviation angle, biplane deviation, and biplane deviation angle.

3. The computer based method of claim 1, wherein the information aligning the plurality of bearing seal components on the shaft includes at least one of: substantially perpendicular alignment information and substantially parallel alignment information.

4. The computer based method of claim 1, wherein the plurality of bearing seal components include at least one spacer component, a ball bearing component, a sealing component, and a nut.

5. The computer based method of claim 4, wherein the sealing component includes at least one member selected from the group comprising: an axial seal and a radial seal.

6. The computer based method of claim 1, further comprising coupling the plurality of bearing seal components to the shaft based on the outputted assembly instructions.

7. The computer based method of claim 6, wherein a constant pressure is applied to each bearing seal component during assembly.

8. The computer based method of claim 7, wherein hydraulic tooling applies the constant pressure to each bearing seal component.

9. The computer based method of claim 6, wherein a temperature is applied to each bearing seal component during assembly.

10. The computer based method of claim 9, wherein the temperature is selected from a group consisting of hot and cold.

11. The computer based method of claim 6, further comprising verifying the bearing seal is correctly coupled to the shaft.

12. The computer based method of claim 1, wherein measuring characteristics of the subject shaft includes:
    rotating the shaft at a speed from zero to five revolutions per minute; and
    engaging a face of the shaft with at least one sensor effectively coupled to the computer for measuring characteristics of the face.

13. The computer based method of claim 1, wherein measuring characteristics of a bearing seal component includes:
    rotating the bearing seal component at a speed from zero to five revolutions per minute; and
    engaging a face of the bearing seal component with at least one sensor effectively coupled to the computer for measuring characteristics of the face.

14. A computer based system for assembling turbine engine parts, comprising:
    a measurement device effectively coupled to a computer configured to measure characteristics of a plurality of bearing seal components and a subject shaft; and
    a determination module receiving the measured characteristics and outputting assembly instructions having information configured to align the plurality of bearing seal components on the shaft of a turbine engine, the determination module determining alignment information of each of the bearing seal components with the shaft based on the measured characteristics.

15. The computer based system of claim 14, wherein the measurement device comprises:
    a bed adapted to hold a bearing seal component or the subject shaft; and
    at least one sensor effectively coupled to the computer for measuring characteristics of the bearing seal component or the subject shaft.

16. The computer based system of claim 15, wherein the bed includes a variable speed drive for rotating the bearing seal component or the subject shaft.

17. The computer based system of claim 16, wherein the variable speed drive rotates the bearing seal component or the subject shaft at a speed from zero to five revolutions per minute.

18. The computer based system of claim 14, wherein the measured characteristics include at least one of roundness, flatness, concentricity, concentricity angle, runout, runout angle, perpendicularity, perpendicularity angle, perpendicular plane deviation, centerline deviation, centerline deviation angle, biplane deviation, and biplane deviation angle.

19. The computer based system of claim 14, wherein the plurality of bearing seal components include at least one spacer component, a ball bearing component, a sealing component, and a nut.

20. A computer based system for assembling turbine engine parts, comprising:
    means for measuring characteristics of a plurality of bearing seal components and a subject shaft, the means effectively coupled to a computer; and
    computer means for receiving the measured characteristics and outputting assembly instructions having information for aligning the plurality of bearing seal components on the shaft of a turbine engine, the computer means determining alignment information of each of the bearing seal components with the shaft based on the measured characteristics.

* * * * *